Patented Apr. 22, 1952

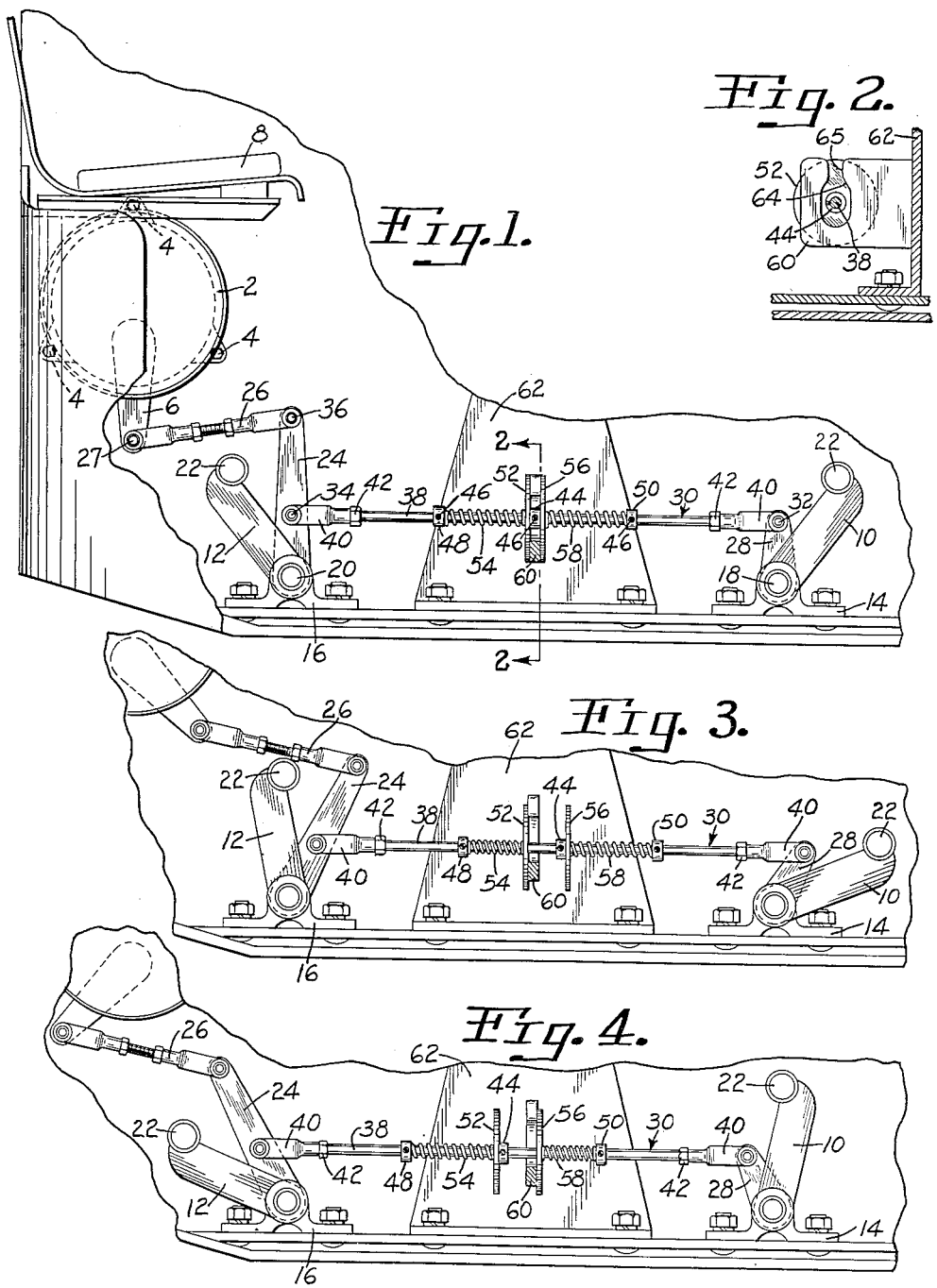
April 22, 1952    J. W. WOOLF    2,593,643
SWITCH CONTROL MECHANISM
Filed Dec. 30, 1948
INVENTOR:
James W. Woolf
BY John F. Schmidt
ATTORNEY.

2,593,643

UNITED STATES PATENT OFFICE 2,593,643

SWITCH CONTROL MECHANISM

James W. Woolf, Franklin, Pa., assignor to Joy Manufacturing Company, Pittsburgh, Pa., a corporation of Pennsylvania Application December 30, 1948, Serial No. 68,124

6 Claims. (Cl. 200—153)

This invention relates to a control mechanism, especially to a control for a shuttle car in which the operator faces in one direction to operate the car in that direction, and faces the other way to operate the car in the opposite direction.

In the operation of automotive shuttle cars it is desirable to have a control system which is simple and efficient; it is furthermore desirable that the control system be such that upon release of operating pressure, the system will automatically return to neutral.

It is an object of this invention to provide control mechanism which is very simple in construction and can therefore be easily and economically manufactured, and which quickly returns to neutral when the operator releases the controls.

This and other objects are accomplished in a device in which a pair of pedally operated control members is connected together and to the actuating arm of a control switch by linkage which is associated with resilient mechanism so arranged as to quickly return the entire mechanism to neutral upon release of the control members by the operator.

In the drawings:

Fig. 1 is a view in elevation of a portion of the side of a shuttle car showing a portion of the control station with parts broken away to afford a better view of the invention. The mechanism is shown in neutral in this figure.

Fig. 2 is a view in section on line 2—2 of Fig. 1.

Fig. 3 is a view similar to Fig. 1, but showing the mechanism in one switch-closing or operating position; and Fig. 4 is a view similar to Fig. 3 but showing the mechanism in another operating position.

The device of this invention is adapted to be used in mine shuttle cars such as are shown, for example, in U. S. Patents: Des. 118,612, 2,192,650, 2,325,730, 2,325,731 and 2,326,444, but it will be evident to those skilled in the art that the invention has broader applications.

A control switch 2 is shown fastened to the side of a shuttle car by any suitable fastening means such as threaded members 4. An actuating arm 6 is shown extended below the casing of the control switch and is connected to move the switch members into their various operating positions. In Fig. 1, actuating arm 6 is shown in its neutral position, in which the switch is open. The details of switch 2 form no part of this invention, but are disclosed and claimed in my copending application, Serial No. 49,921, filed September 18, 1948.

The usual shuttle car to which the present invention is intended to be applied is provided with oppositely-facing operator's seats, one of which is shown at 8. When the operator is seated in seat 8, he is in position to control the vehicle by the pedally movable member 10. When he is seated in the opposite seat (not shown) he is in a position to control the vehicle by means of the opposite pedally movable member 12. The opposite pedally movable members 10 and 12 are pivotally mounted on pedal brackets 14 and 16 respectively, the pivots being designated 18 and 20 respectively.

Each of the pedally movable members is provided with a pedal 22. The member 12 is provided with a long actuating arm 24 which engages one end of a link 26, the other end of which is connected to the switch actuating arm 6 at pivot 27. The other member, 10, is likewise provided with an actuating arm 28. A link 30 is pivotally connected to actuating arm 28 at 32 and is likewise pivotally connected with actuating arm 24 at 34. In this invention the pivot 34 falls between the aforesaid pivot 20 and the pivot 38, by which arm 24 is connected with link 26; pivot 34 is also preferably spaced from pivot 20 the same distance as pivot 32 is spaced from pivot 18.

Link 30 is preferably made up of a rod 38, threaded into a clevis 40 at each end of the rod. Jam nuts 42 serve to hold the rod 38 against turning in its threaded connection with the clevises.

An abutment 44 is affixed to the link 30 substantially midway between its ends by any suitable means, as for example, by a set screw 46. A spring stop 48 is affixed to rod 38 by a similar set screw 46 and is spaced from abutment 44 along the rod. A similar spring stop 50 is affixed to rod 38 at the opposite side of abutment 44 by another set screw 46, and is similarly spaced from abutment 44.

A spring reaction member 52, movable along the rod 38, is disposed adjacent abutment 44 on the same side thereof as spring stop 48. A spring 54 is arranged on rod 38 in the space between spring stop 48 and spring reaction member 52. Similarly, a spring reaction member 56 is disposed on the opposite side of the abutment adjacent thereto, and a spring 58 similar to spring 54 is disposed on the rod 38 between spring stop 50 and member 56. In the embodiment of the invention shown, the spring reaction member takes the form of a collar or washer.

It will be understood by those skilled in the art that springs 54 and 58 may be pre-loaded, i. e., may be provided with an initial compression. This initial compression may be adjusted by movement of spring stops 48 and 50 along the rod 38. As can be seen from Figs. 3 and 4, and as will be explained below, the members 52 and 56 are both adjacent abutment 44 only when the mechanism is in its neutral position shown in Fig. 1.

Means are provided to engage one of the members 52 and 56 to compress its associated spring upon engagement by an operator, of one of the pedals. This means consists of a centering stop member 60. Stop 60 may consist simply of a plate secured to an upright member 62, mounted on the floor of the vehicle or some other suitable part of the frame thereof. The centering stop 60 is recessed as shown at 64 to permit free vertical movement of rod 38 and abutment 44, and is slotted at 65 for easy assembly and disassembly of the linkage.

Operation

If the vehicle operator desires to propel the vehicle toward the right of an observer looking at the drawings, he takes his place in seat 8 and applies one foot to the pedally movable member 10, moving it into the position shown in Fig. 3. As he presses the pedal of member 10 he causes the mechanism to move out of its neutral position. As rod 38 moves toward the right, spring stop 48 compresses spring 54 between itself and collar 52. As can be seen in Fig. 3, spring 58 is not affected by this movement; the linkage thus constitutes a lost-motion connection. As soon as the operator releases his pressure on member 10, the energy stored up in spring 54 acts to restore the parts to their relative position shown in Fig. 1. The parts cannot move leftward beyond the neutral position because, as soon as the neutral position is reached, the abutment 44 comes against member 52, whereupon link 30 has reached the limit of travel under the influence of spring 54. The combination of the two springs, their members 52 and 56, abutment 44, and stop 60 serves as a locating device, regardless of the relative strengths of the two springs.

Similarly, when the operator desires to move the vehicle toward the left of an observer looking at the drawings, he takes his place in the seat (not shown) which faces seat 8, and is then in a convenient position to operate the vehicle by depressing the pedal of member 12. This time, spring 58 is compressed and restores the parts to neutral when the operator removes pressure from the pedal.

It will be readily evident to those skilled in the art that this invention sets forth an exceedingly simple mechanism which is easily manufactured, and readily operated, and which quickly and easily restores the control switch to its neutral position as soon as the operator releases pressure from the control pedals.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an automotive vehicle, a control switch, an actuating arm for the switch having a neutral position and being movable into at least one operating position at either side of the neutral position, a pair of opposed pedally movable members, linkage positively connecting said pair of members with said switch arm and with each other, and means associated with the linkage for returning the linkage and said pair of members to a position in which said arm occupies its neutral position.

2. The combination of claim 1, in which the last-named means includes a lost-motion connection.

3. The combination of claim 2, in which said connection includes two resilient means, one of which is operative upon actuation of one of said pedally movable members and the other of which is operative upon actuation of the other of said pedally movable members.

4. In combination, a pedally operable control member adapted to be used by an operator facing in a given direction, a second pedally operable control member adapted to be used by an operator facing in the opposite direction, both of said members having neutral positions, a switch, an actuating arm for the switch having a neutral position and being movable into a switch closing position, linkage connecting said members with each other and with said arm, and means associated with the linkage for returning said members and said arm to neutral.

5. The combination of claim 4, in which the last-named means includes an abutment fixed to the linkage, and spring means arranged to be compressed by the abutment upon movement of said members out of their neutral positions.

6. In combination, a switch, a switch actuating arm having a neutral position and an operating position on each side of the neutral position, control means positively connected to move said arm into one of its operating positions, a pair of opposed resilient members cooperatively associated to bias the control means and said arm into neutral, and mechanism associated with the resilient members for locating the control means and said arm in neutral regardless of the relative strengths of the resilient members.

JAMES W. WOOLF.

REFERENCES CITED

The following references are of record in the file of this patent:

UNITED STATES PATENTS

| Number | Name | Date |
| --- | --- | --- |
| 539,863 | Faure | May 28, 1895 |
| 591,210 | Crane | Oct. 5, 1897 |
| 809,773 | Case | Jan. 9, 1906 |
| 1,310,757 | Letord | July 22, 1919 |
| 1,428,460 | Von-Soden | Sept. 5, 1922 |
| 1,611,957 | Smutny | Dec. 28, 1926 |
| 1,646,419 | Peck | Oct. 25, 1927 |
| 2,350,063 | Overby | May 30, 1944 |
| 2,386,706 | Moessinger | Oct. 9, 1945 |
| 2,439,356 | Arens | Apr. 6, 1948 |